United States Patent
Brunnett et al.

(10) Patent No.: US 6,987,638 B1
(45) Date of Patent: Jan. 17, 2006

(54) METHOD AND APPARATUS FOR APPLYING ADAPTIVE NON-LINEAR REPEATABLE RUNOUT COMPENSATION IN A DISK DRIVE

(75) Inventors: Don Brunnett, Pleasanton, CA (US); Yu Sun, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 221 days.

(21) Appl. No.: 10/430,898

(22) Filed: May 5, 2003

Related U.S. Application Data

(60) Provisional application No. 60/377,928, filed on May 3, 2002.

(51) Int. Cl.
*G11B 5/596* (2006.01)

(52) U.S. Cl. .................................................. 360/77.04
(58) Field of Classification Search ........... 360/77.04, 360/78.09; 318/560
See application file for complete search history.

(56) References Cited

U.S. PATENT DOCUMENTS

| 4,616,276 A | 10/1986 | Workman ................... 360/77 |
| 4,628,379 A | 12/1986 | Andrews, Jr. et al. ........ 360/77 |
| 5,155,422 A | * 10/1992 | Sidman et al. .............. 318/560 |
| 5,402,280 A | 3/1995 | Supino .................... 360/77.04 |
| 5,886,846 A | 3/1999 | Pham et al. ............. 360/78.04 |
| 6,002,540 A | 12/1999 | Cunningham et al. ... 360/77.04 |
| 6,456,452 B1 | 9/2002 | Hobson et al. .......... 360/78.07 |
| 6,487,035 B1 | 11/2002 | Liu et al. ................. 360/77.04 |
| 6,768,609 B2 | * 7/2004 | Heydt et al. ............. 360/77.08 |

* cited by examiner

*Primary Examiner*—David Hudspeth
*Assistant Examiner*—K. Wong
(74) *Attorney, Agent, or Firm*—Tejpal S. Hansra

(57) ABSTRACT

A method and apparatus for applying adaptive non-linear repeatable runout compensation in a disk drive is provided. In one embodiment, the present invention provides a disk surface having a track written thereon, wherein the track includes repeatable runout. A non-linear converge gain is applied to compensate for the repeatable runout. In one embodiment, the converge gain is based upon an amplitude of a position error signal associated with the repeatable runout at a frequency of rotation of the disk surface (or multiple thereof).

31 Claims, 5 Drawing Sheets

NON-LINEAR CONVERGE GAIN SCHEME
*Ts : SAMPLING FREQUENCY OF SERVO SYSTEM
n : UPDATE RATES OF THE COMPENSATION TERM

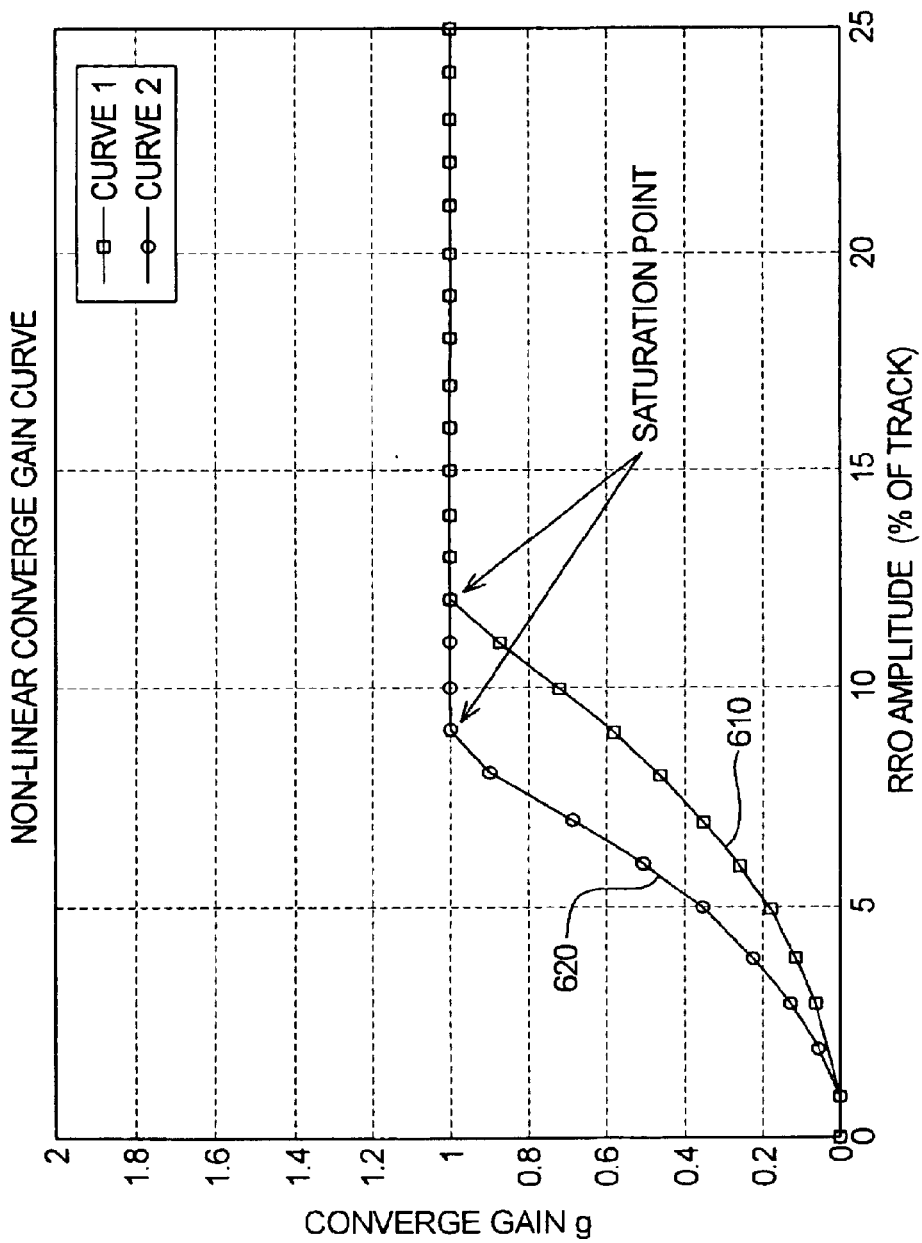

METHOD AND APPARATUS FOR APPLYING ADAPTIVE NON-LINEAR REPEATABLE RUNOUT COMPENSATION IN A DISK DRIVE

CROSS-REFERENCE TO RELATED APPLICATIONS

Priority is claimed from U.S. Provisional Patent Application Ser. No. 60/377,928 filed May 3, 2002, which is incorporated herein by reference in its entirety.

FIELD OF THE INVENTION

The present invention relates to transducer positioning in a magnetic data storage system, such as a computer disk drive. More particularly, the present invention relates to a method and apparatus for compensating for repetitive runout (RRO) in a magnetic data storage system.

BACKGROUND OF THE INVENTION

A disk drive is a data storage device that stores digital data in tracks on the surface of a data storage disk. Data is read from or written to a track of the disk using a transducer, which includes a read element and a write element, that is held close to the track while the disk spins about its center at a substantially constant angular velocity. To properly locate the transducer near the desired track during a read or write operation, a closed-loop servo scheme is generally implemented. The servo scheme uses servo data read from the disk surface to align the transducer with the desired track. The servo data is generally written to the disk using a servo track writer (STW). However, there has been a movement towards having the disk drive self-servo write some portion or, in some cases, all of the servo data.

FIG. 1 illustrates a disk drive, generally designated 10, with which the present invention may be used. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 (having a write head and a read head) mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 may include a plurality of disks 12 and, therefore, a plurality of corresponding actuator arm assemblies 18. However, it is also possible for the disk drive to include a single disk 12 as shown in FIG. 1.

FIG. 2 is a simplified diagrammatic representation of a top view of a disk 12 having a surface 42 which has been formatted to be used in conjunction with a sectored servo system (also known as an embedded servo system). As illustrated in FIG. 2, the disk 12 includes a plurality of concentric tracks 44a–44h for storing data on the disk's surface 42. Although FIG. 2 only shows a relatively small number of tracks (i.e., 8) for ease of illustration, it should be appreciated that typically tens of thousands of tracks are included on the surface 42 of a disk 12.

Each track 44a–44h is divided into a plurality of data sectors 46 and a plurality of servo sectors 48. The servo sectors 48 in each track are radially aligned with servo sectors 48 in the other tracks, thereby forming servo wedges 50 which extend radially across the disk 12 (e.g., from the disk's inner diameter 52 to its outer diameter 54).

In an ideal disk drive system, each of the concentric tracks 44a–44h is centered about a true or actual center 60 of the disk 12. Furthermore, in an ideal disk drive system, the axis of rotation of the disk is aligned with the true center 60 of the disk 12.

In an actual system, however, the axis of rotation of the disk may not correspond with the true center 60 of the disk 12. For example, the axis of rotation may correspond with point 62, as illustrated in FIG. 2. Accordingly, the circular tracks may have an eccentric shape relative to the axis of rotation. Positioning errors created by the eccentric shape of the tracks are known as repeatable runout (RRO) and may occur at a multiple of the frequency of rotation of the disk (e.g., 1f, 2f, 3f, etc.).

In addition to a lack of correspondence between the true center 60 and the axis of rotation, there are many other reasons for repeatable runout. For example, repeatable runout may be due to disk slip, disk wobbling relative to the axis of rotation, disk distortions due to clamping force changes or thermal changes, and bearing irregularities.

Servo sectors 48 provide the transducer 20 with information concerning its position over the magnetic disk 12. More particularly, the servo sectors 48 provide information to the transducer 20 concerning the identity of the track 44 and servo sector 48 over which the transducer 20 is flying, and concerning the position of the transducer with respect to the centerline of the track 44.

When a host computer requests that data be read from or written to a particular data sector 46 (or data sectors) of a track 44, the transducer 20 must be moved to the track 44 and then must be positioned at a predetermined location relative to the centerline of the track 44 before a data transfer can take place. For ease of illustration, it will be assumed that the transducer should be placed on the track centerline in order to read from and write to the disk.

FIG. 3 illustrates a typical servo pattern 300 stored within the servo portion of a servo sector 48 for use in centering a transducer 20 on a desired track 44. The servo pattern 300 includes a plurality of servo bursts 304, 308, 312 and 316 that define the centerlines 320a–c of the tracks 44 of the disk 12. The bursts 304, 308, 312 and 316 are divided into A bursts 304, 312 and B bursts 308, 316 that are each approximately (but are not limited to) a track-width wide and that alternate across the disk surface. The boundary between an A burst and an adjacent B burst (e.g., A burst 312 and B burst 308) defines the centerline (e.g., centerline 320b) of a track 44 on the disk 12.

To center the transducer 20 using the A and B bursts, the transducer 20 is first moved to the desired track 44 during a seek operation and, once there, is allowed to read the A and B bursts on the desired track 44. The signal magnitudes resulting from reading the A and B bursts are then combined (such as by subtracting the B burst magnitude from the A burst magnitude) to achieve an error signal, known as the position error signal (PES). The PES indicates the distance between the center of the transducer 20 and the centerline (e.g., centerline 320b) of the desired track. The PES signal is used by the disk drive 10 to change the position of the transducer 20 to one that is closer to the desired (centered) position. This centering process is repeated for each successive servo sector on the track until the requested read/write operation has been performed in the appropriate data sector 46 of the disk 12.

In order to properly write and read to the track centerline, it is important to determine and compensate for the repeatable runout (RRO) at the frequency of rotation of the disk (or one or more harmonic frequencies), so that the transducer follows, for example, the eccentric shape of the track. Failure to compensate for the RRO may result in oscillation of the transducer at the frequency of rotation of the disk (or one or more of the RRO harmonic frequencies).

One well-known technique for compensating for RRO is depicted in FIG. 4. The technique shown in FIG. 4 uses a single frequency Discrete Fourier Transform (DFT) in order to compensate for the RRO.

In FIG. 4, block 410 represents a compensator (e.g., located in a digital signal processor), block 420 represents the plant, and rro__1$f$ represents the repeatable runout at the frequency of rotation of the disk. It should be noted that the RRO corresponding to a multiple of the frequency of rotation of the disk may be injected into the loop and that the RRO due to the frequency of rotation of the disk is only shown as an example in the figure.

Block 430 is a first integrator loop. An integrated sine term and an integrated cosine term are output for a revolution of the disk from the first integration loop and are fed into blocks 432 and 434, respectively, which represent a traditional Discrete Fourier Transform (DFT).

The output of blocks 432 and 434 are fed into a linear converge gain block 440, which includes loop gain and loop phase adjustments represented by Ksin and Kcos, where the selection of constant K is arbitrary. In the linear gain converge block 440, g represents the converge gain of the cancellation system and will be discussed in more detail below.

The output of the linear converge gain block 440 represents feedforward values in the terms of sine and cosine vector values, and are fed into second integrator loop 450. These values are added to the prior values, represented by sin__rro__upd and cos__rro__upd, wherein the update rate for second integrator loop 450 is once per revolution.

The outputs of the second integrator loop 450 (which are sine and cosine vector values) are then recovered as a time-domain signal, which is the compensation value rro__comp (a sine wave) that is applied at the output of the control. Accordingly, in a perfect system, such value will be used to compensate for RRO at the frequency of the disk rotation (or some multiple of the frequency of the disk rotation), so that the track is accurately followed.

Returning now to the linear converge gain block 440, as mentioned above, g represents the converge gain of the cancellation system, with the constraint that $0 \leq g \leq 2$. Importantly, in prior systems, g has been selected to be a constant. The selection of g has been somewhat arbitrary.

On one hand, if g is chosen to be close to one, a fast converge time is achieved when initially settling on track and rapid tracking. However, the drawback of choosing g to be close to one is that adjacent frequency components may be significantly amplified.

On the other hand, choosing a smaller value for g can reduce the amplification of the adjacent frequency components, while achieving decent RRO attenuation. However, the drawback is that the converge time is relatively slow when initially settling on track and slow tracking as the RRO is changing. In both cases, performance will be sacrificed.

With reference to FIG. 4, the sine and cosine terms of the repeatable runout for the first harmonic may be represented by the following two equations:

$$\text{Runout\_Cosine\_Coefficients}_{current} = \text{Runout\_Cosine\_Coefficients}_{previous} +$$

$$K\cos * g * 2/N * \sum_{k=0}^{N-1} perr(k) *$$

$$\cos(2\pi * k/N)$$

$$\text{Runout\_Sine\_Coefficients}_{current} = \text{Runout\_Sine\_Coefficients}_{previous} +$$

$$K\sin * g * 2/N * \sum_{k=0}^{N-1} perr(k) *$$

$$\sin(2\pi * k/N)$$

where perr(k) is the position error, N is the number of servo sectors, g is the converge gain, K a constant and k is an index.

Accordingly, it would be desirable to develop a method and apparatus for applying repeatable runout compensation using a converge gain g, which results in a relatively fast convergence time and which does not unduly amplify adjacent frequency components.

SUMMARY OF THE INVENTION

The present invention is designed to meet the aforementioned, and other, needs. The invention is directed to a method and apparatus for applying adaptive non-linear repeatable runout compensation in a disk drive.

In one embodiment, the present invention provides a disk surface having a track written thereon, wherein the track includes repeatable runout. A non-linear converge gain is applied to compensate for the repeatable runout, as opposed to a linear converge gain as found in prior disk drives. In one embodiment, the non-linear converge gain is based upon an amplitude of a position error signal associated with the repeatable runout at a frequency of rotation of the disk surface (or a multiple thereof). The non-linear converge gain is relatively large when the amplitude is large and is relatively small when the amplitude is small. In one embodiment, $$g = \frac{A^2}{K_T}$$

when $A^2 < K_T$ and g=1 when $A^2 \geq K_T$, where g is the converge gain, A is the aforementioned amplitude and $K_T$ is a tuning factor.

Other embodiments, objects, features and advantages of the invention will be apparent from the following specification taken in conjunction with the following drawings.

DETAILED DESCRIPTION OF THE PREFERRED EMBODIMENT

Figure 1:
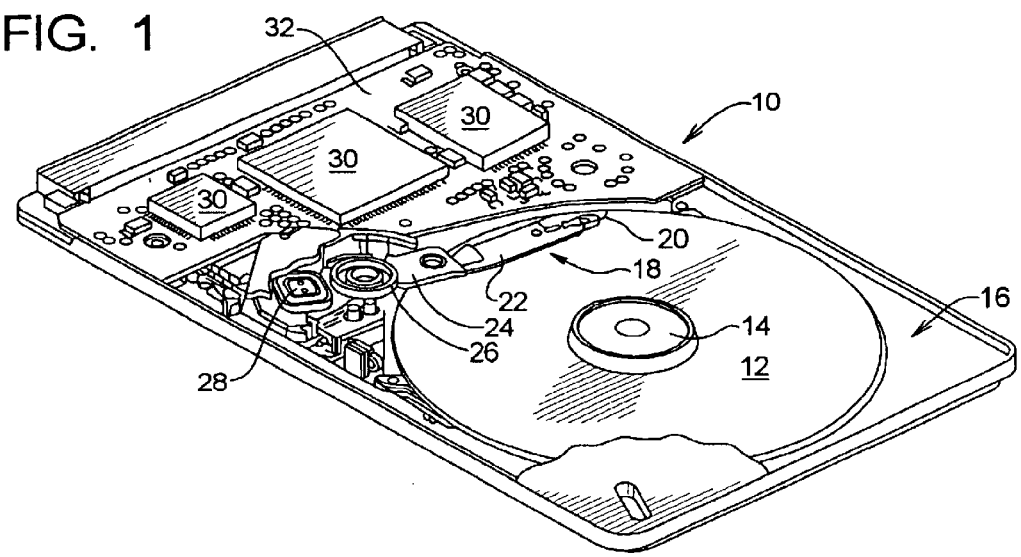
FIG. 1 is a diagrammatic representation illustrating a conventional disk drive, with its top cover removed, in which the present invention may be implemented.
Figure 2:
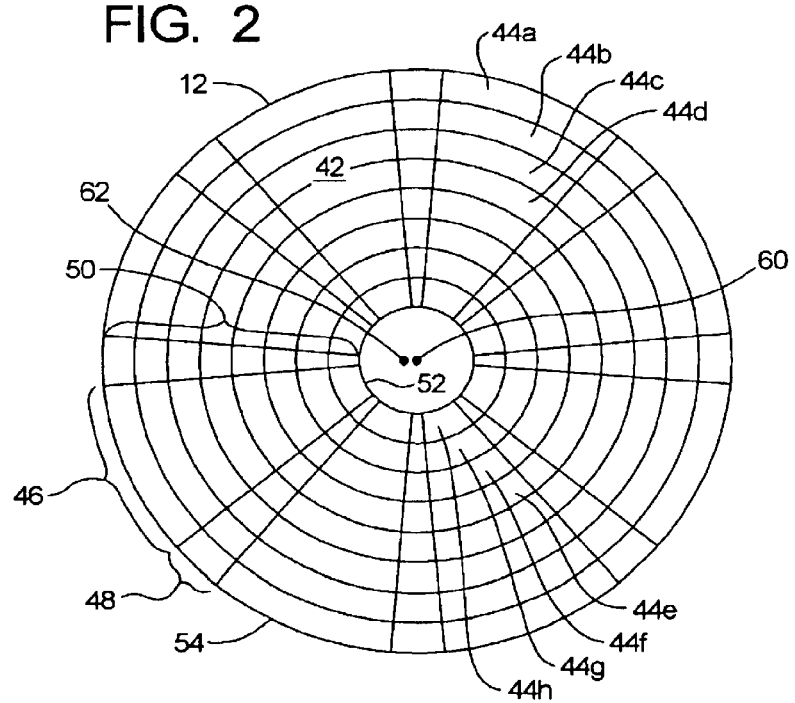
FIG. 2 is a diagrammatic representation of a top view of a magnetic storage disk illustrating a typical organization of data on the surface of the disk.
Figure 3:
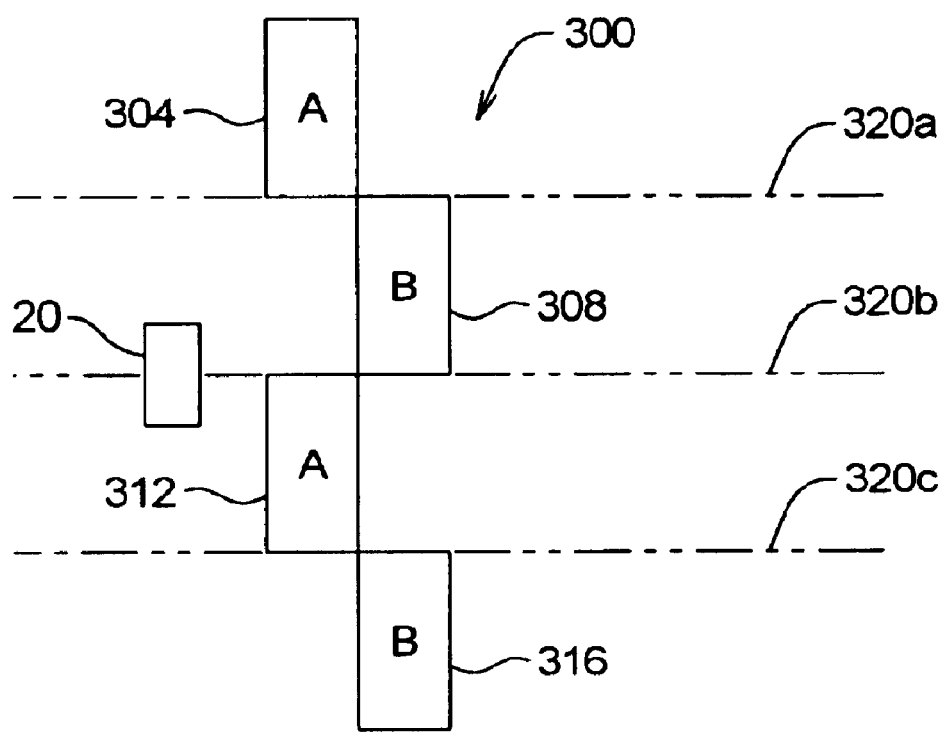
FIG. 3 is a diagrammatic representation of a servo burst pattern that may be used to position a transducer with respect to a track centerline.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 4:
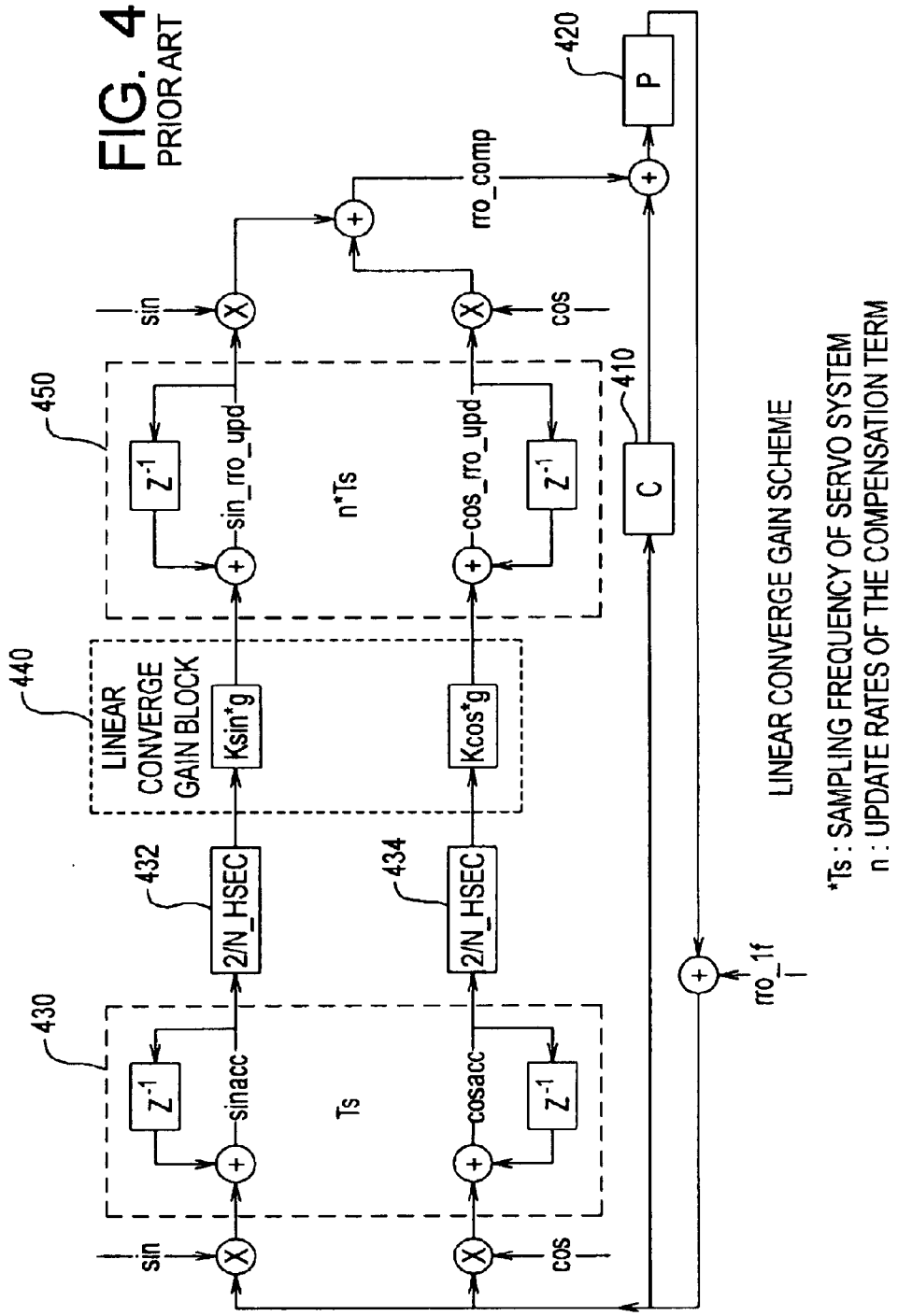
FIG. 4 is a block diagram illustrating a linear converge gain scheme.
Figure 5:
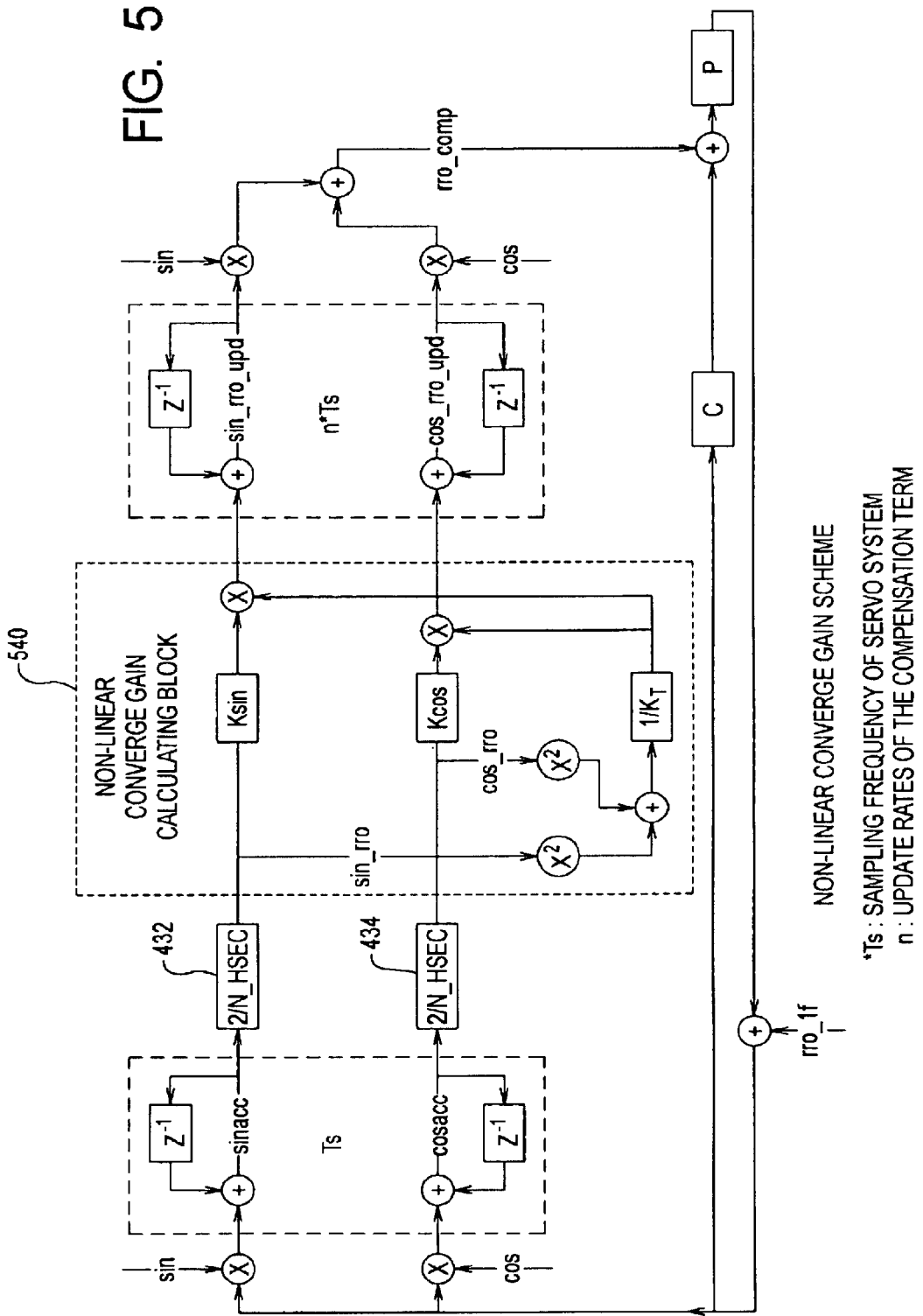
FIG. 5 is a block diagram illustrating one embodiment of the present invention; and, FIG. 6 is a diagram illustrating a non-linear converge gain curve.

FIG. 5 is a block diagram which illustrates one embodiment of the present invention. In contrast to the conventional technique shown in FIG. 4, the present invention includes a non-linear converge gain calculating block 540. The converge gain g is not a constant and is dependent upon the amplitude of the RRO (or, some may prefer, an amplitude of a PES signal associated with the RRO) for the frequency of rotation of the disk (or a multiple thereof), as will be described in further detail herein.

Specifically, the sum of the squares of the outputs from the DFT 432, 434 is equal to the square of the amplitude A of the RRO at the frequency of rotation of the disk (or a multiple thereof). The square of the amplitude is then divided by a tuning factor $K_T$ to arrive at the converge gain g. In other words, $$g = \frac{A^2}{K_T}.$$

Therefore, if the amplitude of the RRO at the frequency of rotation of the disk (or some multiple thereof) is large, the converge gain g will be large. In contrast, if the amplitude of the RRO at the frequency of rotation of the disk (or some multiple thereof is small, the converge gain g will be small. By adjusting the converge gain g based upon the amplitude of the RRO at the frequency of rotation of the disk (or a multiple thereof), a relatively fast convergence time is achieved and adjacent frequency components are not unduly amplified.

Because systems having a converge gain g greater than one may be unstable, the converge gain g should be a maximum value of one when $A^2 > K_T$. Accordingly, the converge gain g is more properly given by the following equation:

$$g = \frac{A^2}{K_T}$$

when $A^2 < K_T$ and g=1 when $A^2 \geq K_T$.

FIG. 6 is a diagrammatic representation of a non-linear converge gain curve, which illustrates how the selection of the tuning factor $K_T$ affects how aggressively the converge gain g will be applied. More specifically, in the case of curve 1 (identified by reference numeral 610), the tuning factor $K_T$, which is a constant and can be expressed by a percentage of a track, is equal to approximately 12% of a track. That is, when the square of the amplitude of the RRO for the frequency of rotation of the disk is greater than or equal to 12% of a track, the converge gain g will be equal to one. When the square of the amplitude of the RRO for the frequency of rotation of the disk is less than 12% of a track, the converge gain g will be equal to $$\frac{A^2}{K_T}.$$

Similarly, in the case of curve 2 (identified by reference numeral 620), the tuning factor $K_T$ is equal to approximately 8% of a track. Thus, when the square of the amplitude of the RRO for the frequency of rotation of the disk is greater than or equal to 8% of a track, the converge gain g will be equal to one. When the square of the amplitude of the RRO for the frequency of rotation of the disk is less than 8% of a track, the converge gain g will be equal to $$\frac{A^2}{K_T}.$$

Accordingly, the selection of a lower $K_T$ results in a more aggressive non-linear converge gain, as can be seen by comparing the slope of curve 1 to the slope of curve 2. More specifically, the slope of the non-linear portion of curve 2 (reference numeral 620) is steeper than the slope of the non-linear portion of curve 1 (reference numeral 610). Furthermore, it should be noted that the value of $K_T$ may be selected experimentally or by simulation.

The present invention may be implemented in either software or hardware. For example, the present invention may be implemented in the firmware of the controller and/or channel of the disk drive, or any other convenient place in the disk drive. In addition, the present invention may be implemented in a computer external to the disk drive.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface having a track written thereon, wherein the track includes repeatable runout; and,
   compensating for said repeatable runout by applying a non-linear converge gain.

2. The method of claim 1, wherein the converge gain is based upon an amplitude of a position error signal associated with the repeatable runout at a multiple of a frequency of rotation of the disk surface.

3. The method of claim 2, wherein the converge gain is 1 when said amplitude is greater than a predetermined threshold.

4. The method of claim 2, wherein the converge gain is 1 when $A^2$ is greater than a tuning factor, where A is said amplitude.

5. The method of claim 4, wherein the tuning factor is determined experimentally.

6. The method of claim 4, wherein the tuning factor is determined by simulation.

7. The method of claim 1, wherein a value for the non-linear converge gain is calculated.

8. The method of claim 7, wherein the disk surface is part of a disk drive and said value is calculated during operation of the disk drive.

9. The method of claim 2, wherein the multiple of the frequency of rotation of the disk surface is one.

10. The method of claim 2, wherein the non-linear converge gain is relatively large for larger amplitudes and relatively smaller for smaller amplitudes.

11. The method of claim 2, wherein $$g = \frac{A^2}{K_T}$$

when $A^2 < K_T$ and g=1 when $A^2 \geq K_T$, where g is the converge gain, A is the amplitude and $K_T$ is a tuning factor.

12. A method comprising the steps of:
providing a disk drive having disk surface with a track written thereon, wherein the track includes repeatable runout; and,
compensating for said repeatable runout by applying a converge gain that is calculated during operation of the disk drive
wherein the calculated values of the converge gain are non-linear.

13. The method of claim 12, wherein the converge gain is based upon an amplitude of a position error signal associated with the repeatable runout at a multiple of a frequency of rotation of the disk surface.

14. The method of claim 13, wherein the converge gain is 1 when said amplitude is greater than a predetermined threshold.

15. The method of claim 13, wherein the converge gain is 1 when $A^2$ is greater than a tuning factor, where A is said amplitude.

16. The method of claim 15, wherein the tuning factor is determined experimentally.

17. The method of claim 15, wherein the tuning factor is determined by simulation.

18. The method of claim 13, wherein the multiple of the frequency of rotation of the disk surface is one.

19. The method of claim 13, wherein the converge gain is relatively large for larger amplitudes and relatively smaller for smaller amplitudes.

20. The method of claim 13, wherein $$g = \frac{A^2}{K_T}$$

when $A^2 < K_T$ and g=1 when $A^2 > K_T$, where g is the converge gain, A is the amplitude and $K_T$ is a tuning factor.

21. An apparatus comprising:
a disk surface having a track written thereon, wherein the track includes some repeatable runout; and,
circuitry for compensating for said repeatable runout by applying a non-linear converge gain.

22. The apparatus of claim 21, wherein the converge gain is based upon an amplitude of a position error signal associated with the repeatable runout at a multiple of a frequency of rotation of the disk surface.

23. The apparatus of claim 22, wherein the converge gain is 1 when said amplitude is greater than a predetermined threshold.

24. The apparatus of claim 22, wherein the converge gain is 1 when $A^2$ is greater than a tuning factor, where A is said amplitude.

25. The apparatus of claim 24, wherein the tuning factor is determined experimentally.

26. The apparatus of claim 24, wherein the tuning factor is determined by simulation.

27. The apparatus of claim 21, wherein a value for the non-linear converge gain is calculated.

28. The apparatus of claim 27, wherein said disk surface is located within a disk drive and said value is calculated during operation of the disk drive.

29. The apparatus of claim 22, wherein the multiple of the frequency of rotation of the disk surface is one.

30. The apparatus of claim 22, wherein the non-linear converge gain is relatively large for larger amplitudes and relatively smaller for smaller amplitudes.

31. The apparatus of claim 22, wherein $$g = \frac{A^2}{K_T}$$

when $A^2 < K_T$ and g=1 when $A^2 \geq K_T$, where g is the converge gain, A is the amplitude and $K_T$ is a tuning factor.

* * * * *